US010369588B2

(12) United States Patent
Feilloley et al.

(10) Patent No.: US 10,369,588 B2
(45) Date of Patent: Aug. 6, 2019

(54) INSTALLATION FOR PRODUCING CONTAINERS HAVING A WHEEL FOR BYPASSING A COATING STATION

(71) Applicant: SIDEL PARTICIPATIONS, Octeville-sur-Mer (FR)

(72) Inventors: Franck Feilloley, Octeville-sur-Mer (FR); Laurent Danel, Octeville-sur-Mer (FR); Stephane Linglet, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/730,038

(22) Filed: Oct. 11, 2017

(65) Prior Publication Data

US 2018/0099306 A1   Apr. 12, 2018

(30) Foreign Application Priority Data

Oct. 12, 2016   (FR) ..................................... 16 59843

(51) Int. Cl.
| | |
|---|---|
| *B65G 47/74* | (2006.01) |
| *B65G 47/84* | (2006.01) |
| *B65G 47/52* | (2006.01) |
| *B05C 13/02* | (2006.01) |
| *B65G 47/64* | (2006.01) |
| *B29C 49/42* | (2006.01) |

(52) U.S. Cl.
CPC .......... *B05C 13/025* (2013.01); *B29C 49/421* (2013.01); *B29C 49/4273* (2013.01); *B65G 47/64* (2013.01)

(58) Field of Classification Search
None
See application file for complete search history.

(56) References Cited

U.S. PATENT DOCUMENTS

| 4,479,772 A | 10/1984 | Kleimenhagen |
| 4,629,389 A * | 12/1986 | Kontz ................... B29C 31/002 156/567 |
| 7,073,001 B1 * | 7/2006 | Kucharewski ...... G06F 13/4291 198/836.4 |

(Continued)

FOREIGN PATENT DOCUMENTS

| DE | 10 2014 018 778 A1 | 6/2016 |
| FR | 2 510 470 A1 | 2/1983 |

(Continued)

OTHER PUBLICATIONS

French Search Report, dated Jun. 13, 2017, from corresponding FR application No. 1659843.

*Primary Examiner* — Kavel Singh
(74) *Attorney, Agent, or Firm* — Young & Thompson (57) ABSTRACT

Disclosed is an installation for producing thermoplastic containers including: a container coating station including an input wheel and an output wheel; an upstream transfer wheel that is tangent with the input wheel in an input tangential zone; and a downstream transfer wheel that is tangent with the output wheel in an output tangential zone. The installation includes a bypass wheel that is directly tangent with the upstream transfer wheel in an upstream tangential zone and the bypass wheel that is directly tangent with the downstream transfer wheel in a downstream tangential zone.

20 Claims, 7 Drawing Sheets

(56) References Cited

U.S. PATENT DOCUMENTS

| | | | |
|---|---|---|---|
| 7,357,707 B2 * | 4/2008 | de Vos | A22C 21/003 452/136 |
| 8,307,977 B2 | 11/2012 | Nguyen et al. | |
| 9,242,842 B2 * | 1/2016 | Klenk | B65G 47/847 |
| 2015/0375441 A1 | 12/2015 | Desoutter et al. | |

FOREIGN PATENT DOCUMENTS

| | | |
|---|---|---|
| FR | 3 034 037 A1 | 9/2016 |
| WO | 2006/097796 A2 | 9/2006 |
| WO | 2016/096145 A1 | 6/2016 |
| WO | 2016/151231 A1 | 9/2016 |

* cited by examiner

INSTALLATION FOR PRODUCING CONTAINERS HAVING A WHEEL FOR BYPASSING A COATING STATION

TECHNICAL FIELD OF THE INVENTION

The invention relates to an installation for producing thermoplastic containers comprising a container coating station.

The invention relates more particularly to an installation for producing thermoplastic containers comprising:
- a container coating station comprising an input wheel and an output wheel, each of said wheels being equipped with gripping elements that are uniformly distributed on its periphery;
- an upstream transfer wheel that is equipped with gripping elements that are uniformly distributed on its periphery, the upstream transfer wheel being positioned to make possible the transfer of containers by synchronized passage when a gripping element of the upstream transfer wheel carrying a container coincides with a gripping element of the input wheel in an input tangential zone between the two wheels;
- a downstream transfer wheel equipped with gripping elements uniformly distributed on its periphery, the downstream transfer wheel being positioned to make possible the transfer of containers by synchronized passage when a gripping element of the output wheel carrying a container coincides with a gripping element of the downstream transfer wheel in an output tangential zone between the two wheels.

TECHNICAL BACKGROUND OF THE INVENTION

Installations of this type are already known. The coating station is used to coat the wall of formed containers with a layer of material improving the gas fluid-tightness properties of the container. This layer is, for example, made by plasma deposition on the inside of the container.

The improvement of the fluid-tightness is used particularly for formed containers for small-sized bottles, for example less than 80 cl, which are intended to be filled with a carbonated beverage. In the absence of this fluid-tightness layer, it was actually found that the gas contained in the carbonated beverages had a tendency to escape through the walls of the container too quickly to allow it to be put on the retail market.

Such a problem is not faced for larger-capacity bottles. Actually, the ratio between the volume of the bottle and the area of the wall makes it possible to limit the evaporation of the gas for a sufficiently long time to guarantee the level of gas in the beverage for the customer.

The coating station is positioned in sequence in a production line, downstream from a blow-molding station and upstream from a filling station.

Installations equipped with the coating station are consequently suitable for producing only small-capacity containers. Now, the producers of bottles in the future want production installations that can produce bottles of various sizes. In doing this, large-capacity bottles or bottles that are intended to be filled with a non-carbonated beverage have no need to be coated with a fluid-tightness layer.

Furthermore, when the operation of the coating station must be halted, for example for maintenance reasons, the entire production of the installation is stopped. The downtime of the installation thus leads to a significant loss of production for the producer.

BRIEF SUMMARY OF THE INVENTION

The invention proposes an installation for producing a container of the type described previously, characterized in that it has a bypass wheel equipped with elements for individual gripping of containers that are uniformly distributed on its periphery, the bypass wheel being directly tangent with the upstream transfer wheel in an upstream tangential zone and the bypass wheel being directly tangent with the downstream transfer wheel in a downstream tangential zone.

According to other characteristics of the production installation developed according to the teachings of the invention:
- the upstream tangential zone between the upstream transfer wheel and the bypass wheel is positioned downstream from the input tangential zone between the upstream transfer wheel and the input wheel;
- the downstream tangential zone between the bypass wheel and the downstream transfer wheel is positioned upstream from the output tangential zone between the downstream transfer wheel and the output wheel;
- two consecutive gripping elements of each of the input and output wheels are separated by a circumferential spacing that is two times greater than the circumferential spacing separating two consecutive gripping elements of each of the upstream and downstream transfer wheels;
- each upstream and downstream transfer wheel is equipped with first gripping elements suitable for the gripping of containers having a first size that are arranged alternating with the second gripping elements that are suitable for the gripping of containers having a second size;
- two consecutive gripping elements of the bypass wheel are separated by a circumferential spacing that is two times greater than the circumferential spacing separating two consecutive gripping elements of each of the upstream and downstream transfer wheels;
- two consecutive gripping elements of the bypass wheel are separated by a circumferential spacing that is identical to the circumferential spacing separating two consecutive gripping elements of each of the upstream and downstream transfer wheels;
- the bypass wheel is equipped with first gripping elements suitable for the gripping of containers having the first size that are arranged alternately with the second gripping elements that are suitable for the gripping of containers having the second size.

The invention also relates to a method for using such an installation, characterized in that the containers are distributed to the upstream transfer wheel on every other gripping element, the bypass wheel rotating in a synchronized way with the upstream and downstream transfer wheels.

According to other characteristics of the method for use:
- the bypass wheel is equipped with first gripping elements that are suitable for the gripping of containers having the first size that are arranged alternately with the second gripping elements that are suitable for the gripping of containers having the second size;
- the containers are distributed to the upstream transfer wheel on every other gripping element, the bypass wheel rotating in a synchronized way with the upstream and downstream transfer wheels;

the input and output wheels are desynchronized from the transfer wheels, the gripping elements of said input and output wheels able to interfere with the passage of the bottles being removed;

the input wheel and the output wheel are synchronized in rotation with the transfer wheels so that the gripping elements of the input and output wheels coincide with empty gripping elements in the input and output tangential zones.

BRIEF DESCRIPTION OF THE FIGURES

Other characteristics and advantages of the invention will be brought out during the reading of the detailed description that follows for the understanding of which reference will be made to the accompanying drawings in which.

DETAILED DESCRIPTION OF THE FIGURES

In the description below, elements having an identical structure and/or a similar function will be designated by the same reference.

In the description below, the terms "upstream" and "downstream" will be used as a function of the direction of movement of the containers 18 or as a function of the direction of rotation of the wheels. The direction of rotation of each wheel is indicated by an arrow "F" in FIG. 4 and remains the same in all of the figures.

In the description below, containers of different "sizes" will have different necks, particularly a different outside neck diameter.

Figure 1:
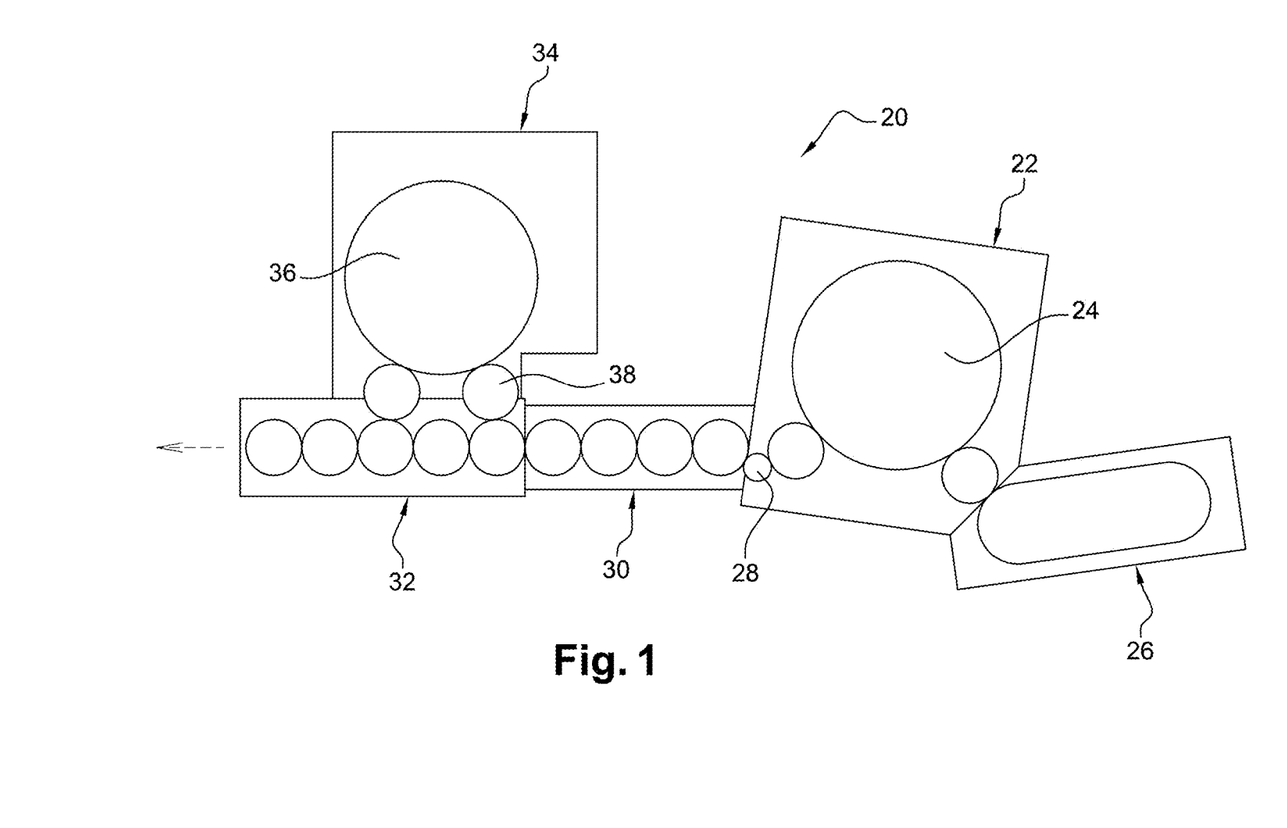
FIG. 1 is a diagrammatic top view that shows an installation for producing containers made according to the teachings of the invention.

Shown in FIG. 1 is an installation 20 for producing containers 18 on a mass scale, particularly bottles. The installation 20 comprises several modules, each of which is intended to be installed in one unit. For this purpose, each module has a single carrier frame. The frame of a module is designed to be able to be transported and deposited as a single unit on the ground.

In the example shown in FIG. 1, a first module is formed by a forming station 22. The forming station 22 comprises a forming carousel 24 for previously-heated preforms. The carousel 24 is carried by the frame of the forming station 22. The carousel 24 carries a plurality of molding units (not shown) that are designed to shape the preforms into containers 18 by forming by means of a pressurized fluid. During the forming operation, the carousel 24 rotates so as to move the hollow bodies continuously from a point of loading a hot preform to a point of off-loading the formed container 18. Such a carousel 24 is well known to a person skilled in the art. It will therefore not be described in further detail.

A furnace 26 for heat-treating preforms here is positioned upstream from the forming station 22. Here, it is a heating tunnel through which series of gripping elements (not shown) pass, each of which is able to carry a preform. The preforms are thus heated during their conveying through the heating tunnel from an entry point of the cold preforms to a transfer point of the hot preforms in the direction of the forming carousel 24. Such a conditioning furnace 26 is well known to a person skilled in the art. It will therefore not be described in further detail below.

The containers 18 continuously come out of the forming station 22 by means of an output transport device 28 carried by the frame of the forming station 22. The output transport device 28 here is formed by a transfer wheel driven in rotation around an approximately vertical axis. The transfer wheel comprises on its periphery elements (not shown) for individual gripping of a container 18.

A second module is positioned directly downstream from the forming station 22. It involves a first conveyor table 30. It is able to pick up the containers 18 coming out of the forming station 22 by means of the output transport device 28 to transport them to a following downstream module.

The following downstream module is formed by a second conveyor table 32 that will be described in more detail below. This conveyor table is particularly designed to ensure the supply and removal of the containers 18 in a module formed by a station 34 for coating containers 18 with a so-called "barrier" layer.

The coating station 34 comprises a processing carousel 36 that is carried by a frame of the coating station 34.

As is shown in more detail in FIG. 4, the containers 18 are routed continuously to the processing carousel 36 by means of an input transfer wheel 38, referred to below as "input wheel." The input wheel 38 is driven in rotation around an approximately vertical axis. It has elements 39 for individual gripping of a container 18 that are uniformly distributed on its periphery.

The processed containers 18 come out from the processing carousel 36 by means of an output transfer wheel 40, referred to as an "output wheel" below. The output wheel 40 is driven in rotation around an approximately vertical axis. It comprises elements 41 for individual gripping of a container 18 that are uniformly distributed on its periphery.

The input wheel 38 and the output wheel 40 are carried by a frame (not shown) that carries the processing carousel 36.

Traditionally, the containers 18 are brought to the input wheel 38 by means of an upstream transfer wheel 42A. The upstream transfer wheel 42A is carried by one of the conveyor tables, here the second conveyor table 32.

At their outputs, the containers 18 are transferred from the output wheel 40 to a downstream transfer wheel 42C that initiates the transport of the coated containers 18 to a following processing station, such as a filling station. The downstream transfer wheel 42C here is carried by the second conveyor table 32.

The invention proposes interposing a transfer wheel, referred to as "bypass wheel 42B," between the upstream transfer wheel 42A and the downstream transfer wheel 42C to make it possible for containers 18 to bypass the coating station 34. This thus makes it possible to produce containers 18 not comprising a barrier layer. In addition, this also makes it possible to continue to produce containers 18 when the coating station 34 is put offline, for example for a maintenance operation and/or for changing container size.

Figure 2:
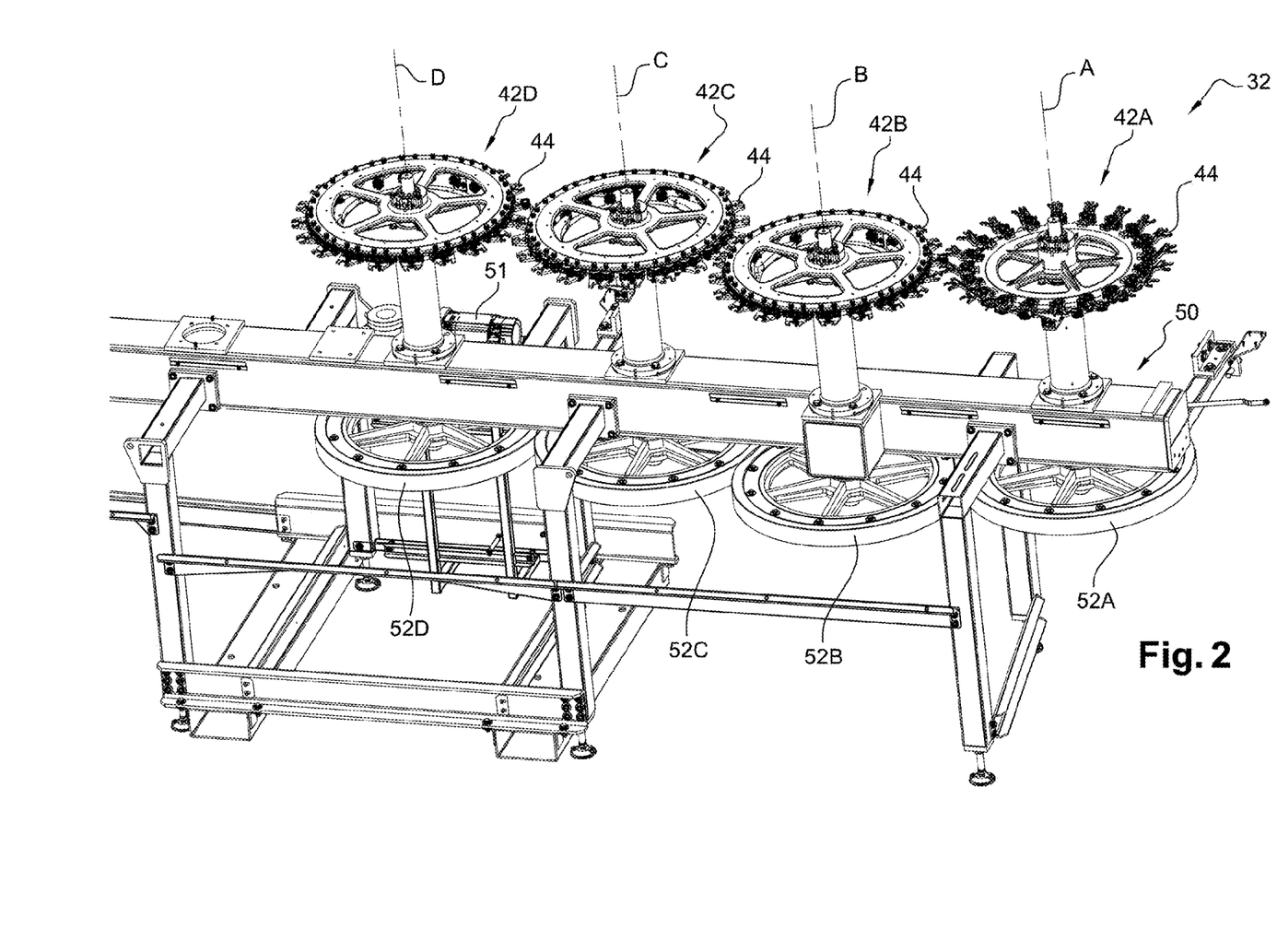
FIG. 2 is a view in perspective that shows a conveyor table of the installation of FIG. 1 that comprises a bypass wheel according to the teachings of the invention.

Shown in FIG. 2 is an upstream end section of the second conveyor table 32 equipped with said bypass wheel 42B.

The second conveyor table 32 comprises a series of at least three transfer wheels 42A to 42C. The wheel 42C forms the downstream transfer wheel 42C that is intended to receive the containers 18 carried by the output wheel 40 of the coating station 34 to convey them toward a downstream station such as a filling station or a labeling station.

The wheel 42A forms the upstream transfer wheel 42A that is intended to supply the input wheel 38 of the coating station 34 with containers 18.

Depending on its length, the conveyor table 32 can comprise other transfer wheels, for example at least one downstream wheel 42D that is positioned downstream from the transfer wheel 42C. The containers 18 are able to be moved in this way by passing successively by the transfer wheels 42A then 42C and 42D, in an activation mode of the coating station 34, or by passing successively by all of the wheels 42A to 42D, in a bypass mode of the coating station 34.

Below, the references of an element associated with a particular transfer wheel will be followed by a letter associated with this transfer wheel.

Each transfer wheel 42A to 42D extends in a horizontal plane, and it comprises a central vertical axis of rotation. The axes of rotation of each transfer wheel 42A to 42D will be designated respectively by the references "A" to "D."

Figure 3:
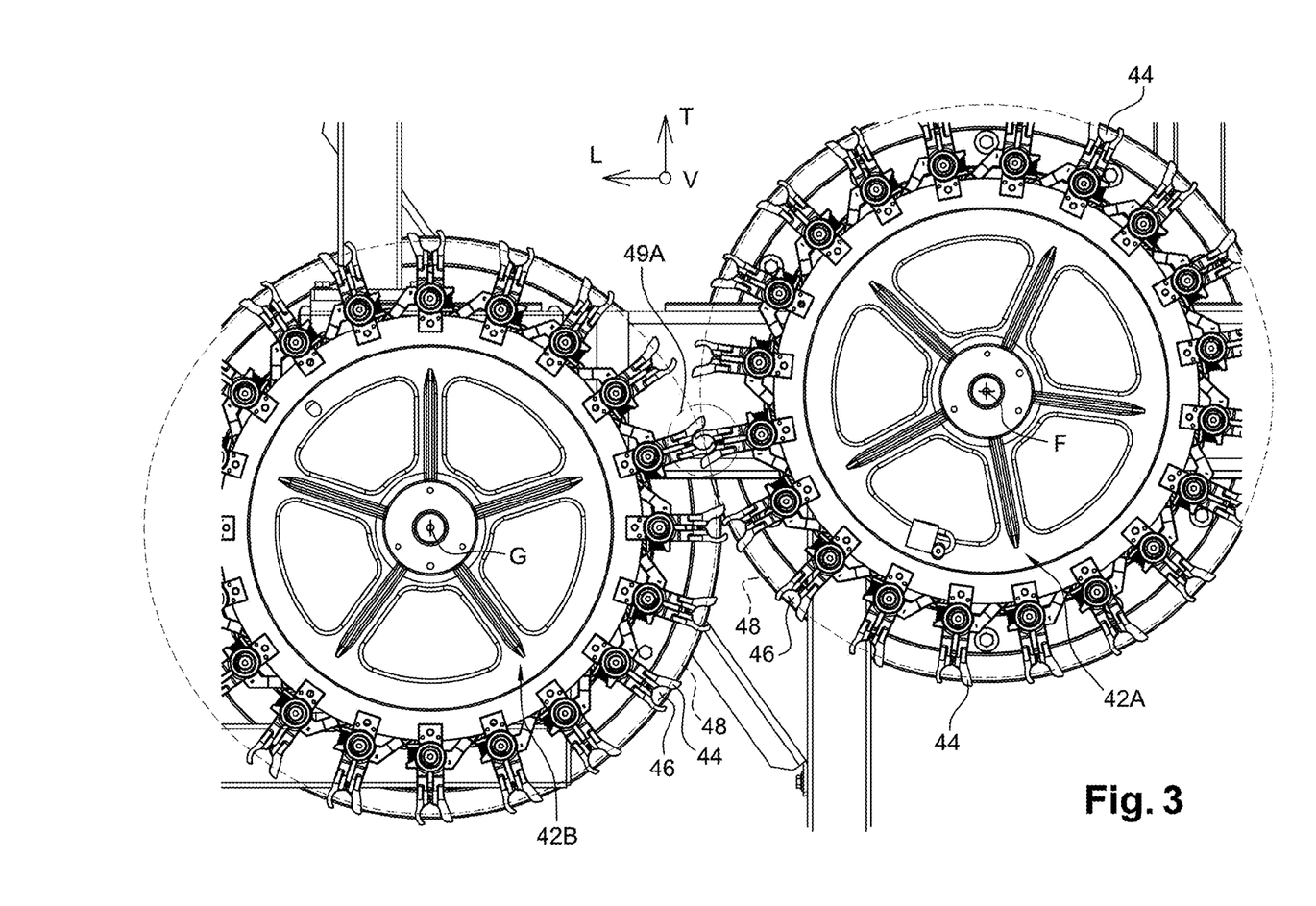
FIG. 3 is a top view that shows two tangent transfer wheels of the conveyor table of FIG. 2.

Shown in more detail in FIG. 3 are two transfer wheels 42A, 42B that are tangent to one another. The following description is, of course, applicable to all of the transfer wheels 42A to 42D of the conveyor table 32, all of the wheels 42A to 42D having an approximately identical structure.

Referring to FIG. 3, each transfer wheel 42A, 42B comprises on its periphery elements 44A, 44B for individual gripping of a container 18. As will be explained below, the gripping elements 44A to 44B are even-numbered on each transfer wheel 42A, 42B, here numbered 20 per transfer wheel. They are uniformly distributed on the periphery of the transfer wheel 42A, 42B. Each gripping element 44A, 44B is able to support a container 18 individually and to hold it in position during its transport.

In the embodiment shown in the figures, each gripping element 44A to 44D is formed by a clip that is able to grasp the container 18 by its neck. The clips of each gripping element 44A to 44D can have a different structure to perform the gripping function.

Referring again to FIG. 3, the point between two jaws of the clip 44A, 44B that corresponds to the position of an axis of the neck (not shown) of the container 18 when it is grasped by the clip will be called center 46 of the clip. Below, a circle centered on the axis of rotation of each transfer wheel 42A, 42B that passes through the center 46 of the clips of said transfer wheel 42A, 42B will be called reference circle 48.

To make possible the transfer of the containers 18 from a transfer wheel 42A to the following transfer wheel 42B, two successive transfer wheels are tangent in horizontal projection. More particularly, their reference circles 48 are tangent in a tangential zone 49A.

With reference to FIG. 3, when they are formed by clips, the gripping elements 44A of the upstream transfer wheel 42A are actuated into open position to let the container 18 leave onto the downstream transfer wheel 42B when they pass into the tangential zone 49A, for example by means of cam control (not shown). Just before the gripping element 44A is actuated into open position, the corresponding element 44B of the following transfer wheel 42B is actuated into closed position, for example by means of cam control, to grasp said preform. Thus, the preform is continuously held by at least one gripping element. The opening of the gripping element 44A makes it possible to let the preform leave onto the following wheel 42B. This operation is, of course, applicable to all of the tangent transfer wheels.

As is shown in FIG. 3, the upstream end transfer wheel 42A and the bypass wheel 42B are directly tangent in the tangential zone 49A between the two transfer wheels 42A, 42B, referred to as "upstream tangential zone 49A." In this upstream tangential zone 49A, each gripping element 44A of the upstream transfer wheel 42A is able to coincide vertically with a corresponding gripping element 44B of the bypass wheel 42B so that the neck of the container 18 is supported simultaneously by the two coinciding gripping elements 44A, 44B. For this purpose, the gripping elements 44A of a wheel 42A are slightly offset vertically, in the direction of the height, relative to the gripping elements 44B of the adjacent wheels 42B to avoid any interference between them during their passage in the tangential zone 49A.

Figure 4:
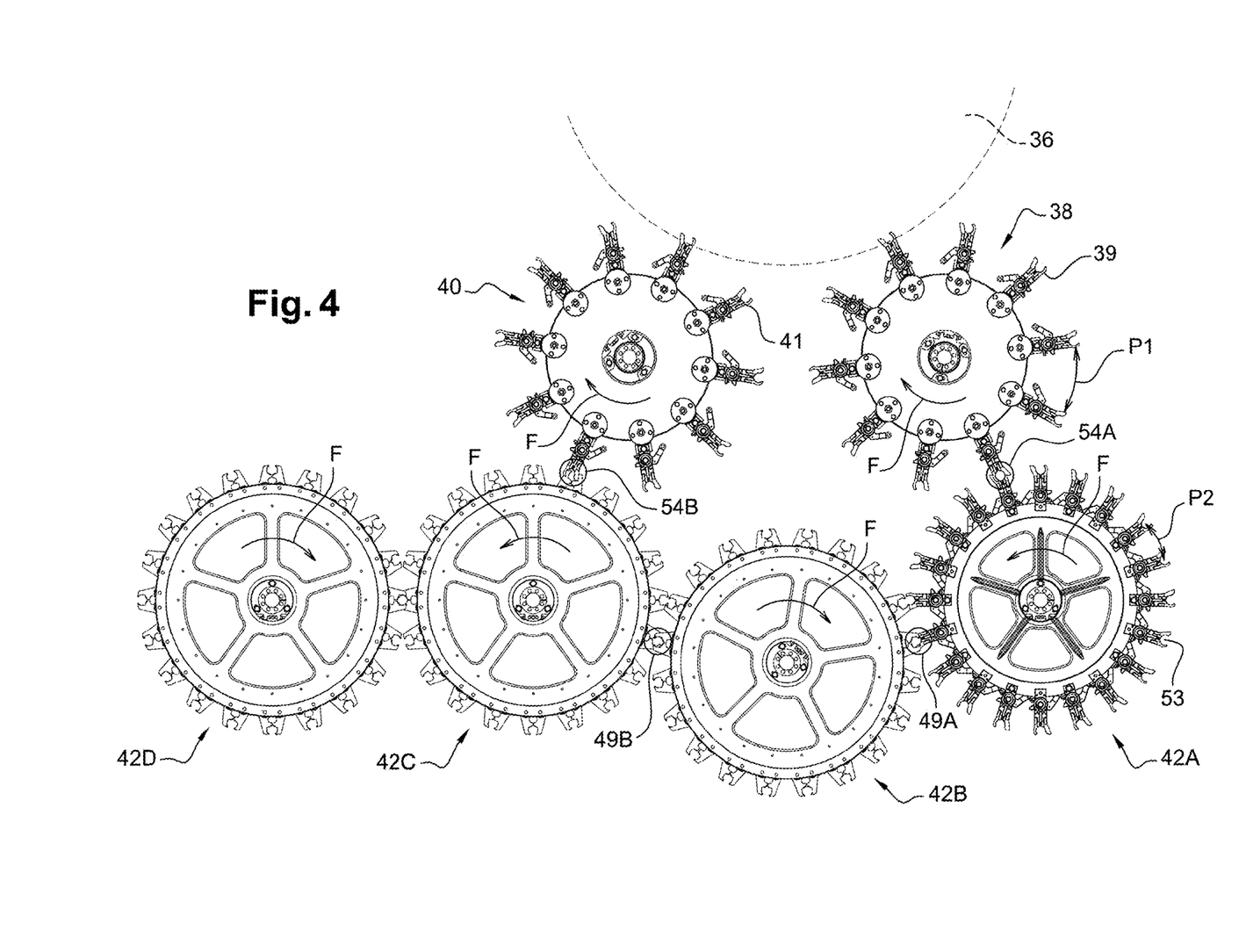
FIG. 4 is a top view that shows the transfer wheels of the conveyor table of FIG. 2 as well as the input and output wheels of a coating station.

As shown in a less detailed manner in FIG. 4, the bypass wheel 42B and the downstream transfer wheel 42C are also directly tangent in a tangential zone 49B between the two transfer wheels 42B, 42C, referred to as "downstream tangential zone 49B." In this downstream tangential zone 49B, each gripping element 44B of the bypass wheel 42B is able to coincide vertically with a corresponding gripping element 44C of the downstream transfer wheel 42C so that the neck of the container 18 is supported simultaneously by the two coinciding gripping elements 44B, 44C.

This arrangement of the bypass wheel 42B that is directly tangent simultaneously with the upstream transfer wheel 42A and with the downstream transfer wheel 42C makes possible the transfer of containers 18 from the upstream transfer wheel 42A to the downstream transfer wheel 42C parallel to the coating station, i.e., without the container having to pass through the coating station.

The conveyor table 32 also comprises a rigid common frame 50 that carries all of the transfer wheels 42A to 42D in rotation around their axis "A" to "D."

By "rigid" frame, it will be understood that the frame 50 deforms very little during its transport. The frame 50 particularly is not hinged.

In a known way, two successive transfer wheels rotate in opposite directions in a synchronized way so that each gripping element 44 coincides with a corresponding gripping element 44 of the downstream transfer wheel in the tangential zone.

Advantageously, a single drive element 51 drives in rotation all of the transfer wheels 42A to 42D in series by means of transmission elements for movement.

For this purpose, each transfer wheel 42A to 42D is mounted integral in rotation with a coaxial gear 52A to 52D that engages directly with a gear 52A to 52D mounted integral in rotation coaxially with the adjacent transfer wheel 42A to 42D, as is illustrated in FIG. 2. The gears 52A to 52D have a pitch circle that is approximately equal to the diameter of the reference circle 48 of the transfer wheels 42A to 42D.

Thus, putting into rotation any transfer wheel 42A to 42D of the conveyor table 32 drives in rotation in a synchronized manner all of the other transfer wheels 42A to 42D of the conveyor table 32 by successive engagement of the gears 52A to 52D with one another.

As shown in FIG. 2, the drive element 51 is, for example, formed by a motor, here an electric motor, which drives in rotation a drive pinion that is engaged with the gear 52D of one of the transfer wheels 42D.

As a variant, it will be understood that the gears can be replaced by other known means for synchronized transmission of movement, such as belts and pulleys.

According to another variant, each wheel is driven individually. The motors of each wheel are then synchronized by an electronic control unit.

In the embodiment shown in the figures, the elements 52A to 52D for transmission are not intended to be coupled to elements for transmission of another module, particularly to the coating station 34. Thus, the input and output wheels 38, 40 are able to be desynchronized from the transfer wheels 42 of the conveyor table 32.

Returning to the definition of the upstream and downstream tangential zones 49A, 49B, an input tangential zone 54A is defined between the downstream transfer wheel 42A and the input wheel 38 of the coating station 34. Likewise, an output tangential zone 54B is defined between the downstream transfer wheel 42C and the output wheel 40 of the coating station 34.

To make possible an effective transfer of the containers 18 between the upstream and downstream transfer wheels 42A, 42C and the input and output wheels 38, 40, each of the input and output wheels 38, 40 have a reference circle with a diameter equal to that of the transfer wheels 42A to 42D. Furthermore, in normal operation, the input and output wheels 38, 40 rotate at the same speed as the transfer wheels 42A to 42D.

The containers 18 are picked up by the upstream transfer wheel 42A at a point 53 that corresponds here to a tangential zone with a downstream end transfer wheel of the first conveyor table 30.

Considering the direction of movement of the containers 18 that are transported by the upstream transfer wheel 42A, the upstream tangential zone 49A between the upstream transfer wheel 42A and the bypass wheel 42B is positioned downstream from the input tangential zone 54A between the upstream transfer wheel 42A and the input wheel 38. Thus, containers 18 carried by the upstream transfer wheel 42A first pass by the input tangential zone 54A before arriving in the upstream tangential zone 49A.

Likewise, considering the direction of movement of the containers 18 that are transported by the downstream transfer wheel 42C, the downstream tangential zone 49B between the bypass wheel 42B and the downstream transfer wheel 42C is positioned upstream from the output tangential zone 54B between the downstream transfer wheel 42C and the output wheel 40. Thus, containers 18 carried by the downstream transfer wheel 42C first pass by the downstream tangential zone 49B before arriving in the output tangential zone 54B.

Figure 5:
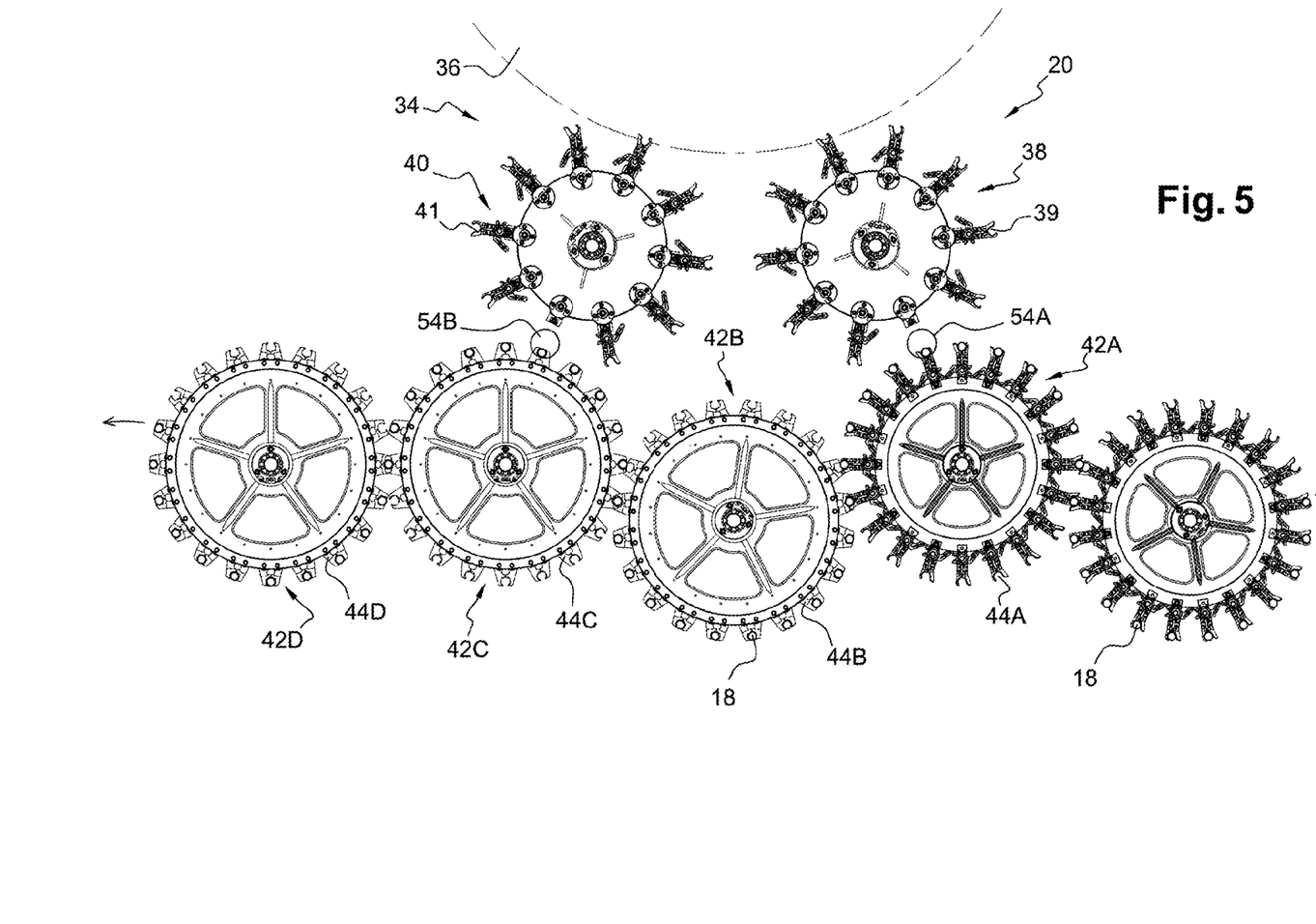
FIG. 5 is a view similar to that of FIG. 4 in which the installation is operating in bypass mode according to a first embodiment of the invention.

According to a first embodiment of the invention, when the installation 20 is operating in a mode for bypassing the coating station 34, the gripping elements 39, 41 of said input and output wheels 38, 40 that can interfere with the passage of the containers 18 are removed, as is illustrated in FIG. 5.

Thus, when the input and output wheels 38, 40 of the coating station 34 are immobilized, only the gripping elements 39, 41 that are found in the input and output tangential zones 54A, 54B are removed.

As a variant, when the input and output wheels 38, 40 of the coating station 34 are intended to rotate, for example for a maintenance operation, all of the gripping elements 39, 41 of said wheels 38, 40 are removed.

In this way, the containers 18 pass from the upstream transfer wheel 42A to the downstream transfer wheel 42C by means of the bypass wheel 42B.

In this embodiment, the input and output wheels 38, 40 are each able to have just as many gripping elements as a transfer wheel.

Further, in this embodiment, each of the gripping elements 44 carries a container 18 as is illustrated in FIG. 5.

Figure 6:
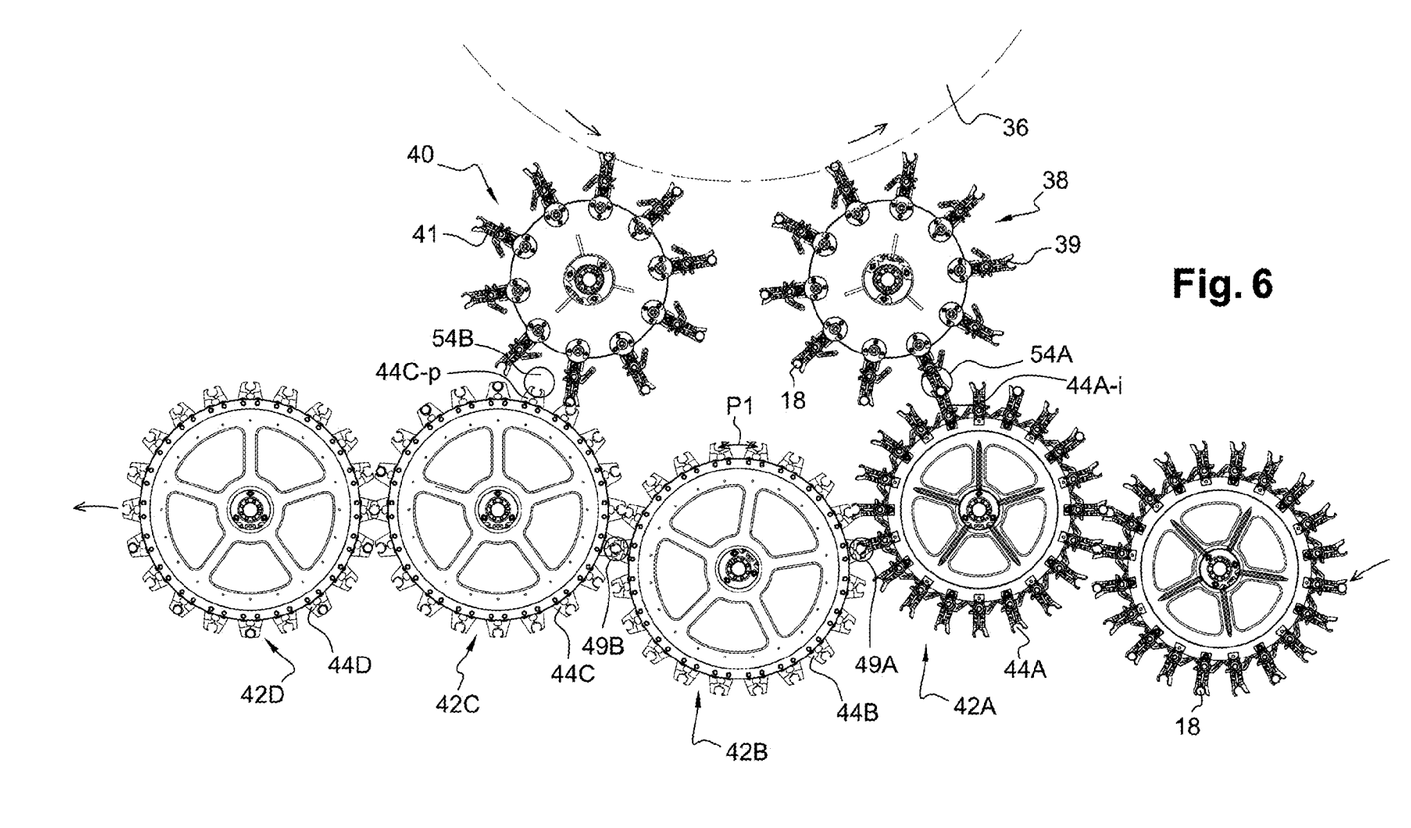
FIG. 6 is a view similar to that of FIG. 4 in which the installation is operating in coating mode of the containers according to a second embodiment of the invention.
Figure 7:
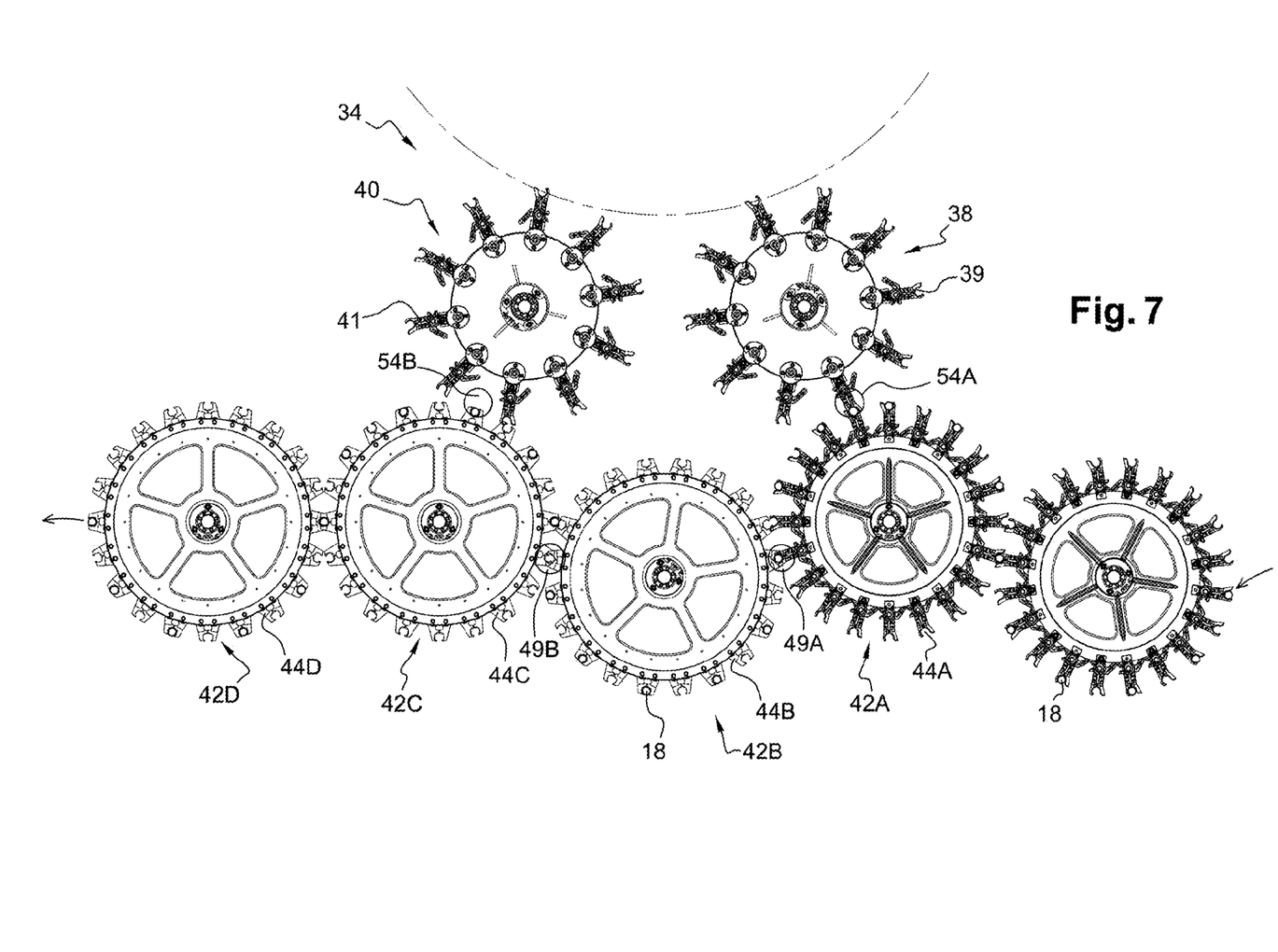
FIG. 7 is a view similar to that of FIG. 5 in which the installation is operating in bypass mode according to a second embodiment of the invention.

A second embodiment of the invention that is shown in FIGS. 6 and 7 makes it possible to avoid removing the gripping elements 39, 41 of the input and output wheels 38, 40, in bypass mode.

To prevent all of the containers 18 from being automatically transferred to the input wheel 38 before arriving in the upstream tangential zone 49A, two consecutive gripping elements 39 of the input wheel 38 are separated by a circumferential spacing "P1" that is two times greater than the circumferential spacing "P2" that separates two consecutive gripping elements of each of the upstream and downstream transfer wheels, as is illustrated in FIG. 4. For this purpose, each of the input and output wheels 38, 40 has two times fewer gripping elements 39, 41 than a transfer wheel 42A to 42D. In the embodiment shown in the figures, the input wheel 38 and the output wheel 40 each have ten gripping elements 39, 41.

Thus, in synchronized operation of the transfer wheels 42A to 42D, each odd gripping element 44A of the upstream transfer wheel 42A is able to coincide with a gripping element 39 of the input wheel 38 in the input tangential zone 54A, as is illustrated on the right in FIG. 6 for the odd gripping element of the upstream transfer wheel 42A indicated by the reference "44A-i."

In contrast, each even gripping element 44A of the upstream transfer wheel 42A passes into the input tangential zone 54A between two gripping elements 39 of the input wheel 38, as is illustrated on the left in FIG. 6 for the even gripping element of the downstream transfer wheel 42C indicated by the reference "44C-p."

In the example shown in FIGS. 6 and 7, two consecutive gripping elements 44B of the bypass wheel 42B are separated by a circumferential spacing "P1" that is identical to the circumferential spacing "P1" that separates two consecutive gripping elements 44A, 44C of each of the upstream and downstream transfer wheels 42A, 42C. Thus, all of the gripping elements 44A of the upstream transfer wheel 42A, or of the downstream transfer wheel 42C, coincide with a corresponding gripping element 44B of the bypass wheel 42B as it passes in the upstream tangential zone 49A, or in the downstream tangential zone 49B.

In a symmetrical manner, the gripping elements 41 of the output wheel 40 coincide with the odd gripping elements 44C of the downstream transfer wheel 42C, while the even gripping elements 44C of said downstream transfer wheel 42C pass between two consecutive gripping elements 41 of the output wheel 40 in the area of the output tangential zone 54B.

The installation 20 is able to operate according to a first mode of operation referred to as "for coating of the containers 18" and according to a second mode of operation referred to as "for bypassing the coating station 34." Regardless of the mode of operation activated, every other gripping element 44A of the transfer wheel 42A is left unoccupied. This is done, for example, by adjusting the angular indexing of the blow-molding carousel. Such an operation is particularly permitted by the fact that each module has an independent drive means for its mobile elements.

As shown in FIG. 6, in coating mode, only the odd gripping elements 44A of the upstream transfer wheel 42A are supplied with containers 18. The even gripping elements 44A are left open. Thus, the containers 18 are automatically transferred to the input wheel 38 that rotates in a synchronized manner with the transfer wheels 42A to 42D.

As shown in FIG. 7, in the mode for bypassing the coating station 34 of the installation, the containers 18 are distributed to the even gripping elements 44A of the upstream transfer wheel 42A, the bypass wheel 42B rotating in a synchronized manner with the upstream and downstream transfer wheels 42A, 42C. Thus, when the even gripping element 44A carrying a container 18 arrives in the area of the input tangential zone 54A, it does not coincide with a gripping element 39 of the input wheel 38. The gripping element 44A therefore continues on its path while carrying the container 18 to the upstream tangential zone 49A in which the container 18 is transferred to a gripping element 44B that coincides with the bypass wheel 42B.

The input wheel 38 and the output wheel 40 are thus synchronized in rotation with the transfer wheels 42A to 42D so that the gripping elements 39, 41 of the input and output wheels 38, 40 coincide with empty gripping elements 44A, 44C in the input and output tangential zones 54A, 54B.

The gripping element 44B of the wheel 42B passes by the downstream tangential zone 49B coinciding with an even gripping element 44C of the downstream transfer wheel 42C. The container 18 is thus transferred to said even gripping element 44C.

The container 18 continues on its path while being transported by the even gripping element 44C. When it passes by the output tangential zone 54B, it does not coincide with any gripping element 41 of the output wheel 40. It is therefore free to continue on its path to the tangential zone with the next transfer wheel 42D without interfering with a gripping element 41 of the output wheel 40.

In these two modes of operation, the input and output wheels 38, 40 are able to rotate in a synchronized way with the transfer wheels 42A to 42D.

In a variant, the gripping elements 39, 41 of the input and output wheels 38, 40 are activated continuously in open position, for example by removal of the control cam. Thus, even when the preforms pass by the tangential zones 54A, 54B in a synchronized way with the gripping elements 39, 41 of the input and output wheels 38, 40, they are not grabbed by said gripping elements 39, 41. Thus, the preforms continue on their path on their respective upstream or downstream transfer wheel 42A, 42C.

According to another variant, not shown, of the invention, in bypass mode, it is possible to immobilize the input and output wheels in an intermediate position in which none of their gripping elements are present in one of the input or output tangential zones in a manner similar to that which is illustrated in FIG. 5. Such an operation makes it possible in particular to immobilize the coating station for a maintenance operation while allowing the production of containers 18 in a bypass mode.

According to another variant, not shown, of the invention, the input and output wheels are desynchronized from the transfer wheels, the gripping elements of said input and output wheels that are able to interfere with the passage of the containers 18 being removed. This makes it possible in particular to perform maintenance operations on the coating station that necessitate actuating the input and output wheels.

Thus, when the input and output wheels 38, 40 are immobilized, it is possible to remove only the gripping element 39, 41 that is located in the input and output tangential zones 54A, 54B, as is illustrated in FIG. 5.

In a variant, all of the gripping elements of the input and output wheels are removed. This makes it possible in particular to have the input and output wheels rotate freely without interfering with the passage of the preforms.

According to a third embodiment of the invention that will be explained with reference to FIGS. 6 and 7, each transfer wheel 42A to 42D is equipped with first gripping elements that are suitable for the gripping of containers 18 that have a first size that are positioned alternately with the second gripping elements that are suitable for the gripping of containers 18 having a second size.

The first size is, for example, formed for small-sized bottles that must be coated with a barrier layer, while the second size is formed for larger-sized bottles that do not require being coated with a barrier layer. The bottles of the first size have, for example, a neck having a diameter that is less than or equal to 16 mm, while the bottles of the second size have a neck that has a diameter that is greater than 16 mm, for example 20 mm. Referring to the description of the second embodiment, the gripping elements that correspond to the first size thus form the odd gripping elements 44-$i$, while the gripping elements that correspond to the second size form the even gripping elements 44-$p$.

The operation of such an installation is identical to that described in the second embodiment. Thus, the small-sized containers 18 pass automatically by the coating station 34, as illustrated in FIG. 6, while the large-sized containers 18 pass automatically by the bypass wheel 42B, as illustrated in FIG. 7.

As a result, the input and output wheels 38, 40 are each equipped with gripping elements 39, 41 that are suitable for the gripping of containers 18 having only the first size.

Advantageously, the bypass wheel is equipped with first gripping elements that are suitable for the gripping of containers 18 that have the first size that are arranged alternately with the second gripping elements that are suitable for the gripping of containers 18 that have the second size. Thus, if it is desired to bypass the coating station 34 to make bottles of reduced size without a barrier layer, it is enough to offset the transfer wheels by a spacing "P1" in relation to the input and output wheels 38, 40. In this way, the odd gripping elements pass hereafter by the input and output tangential zones 54A, 54B between two consecutive gripping elements 39, 41 of said wheels.

The installation 20 made according to any one of the embodiments of the invention as well as the method for using such an installation 20 advantageously make it possible to make on the same installation containers 18 that are coated with a barrier layer and containers 18 that are not coated with a barrier layer.

Also, such an installation 20 is able to proceed with the production of containers 18 even when the coating station 34 is put off-line, for example for a maintenance operation.

Furthermore, an installation made according to the third embodiment of the invention also makes it possible easily to change the size of containers 18 without having to replace the gripping elements.

Moreover, each transfer wheel 42A to 42D of the table 32 comprises at least two times more gripping elements 44A to 44D than each wheel 38 and 40 and than the blow-molding output wheel. Thus, it is possible to provide gripping elements 44A to 44D for a first size that corresponds to the size that is able to be loaded on the input and output wheels 38, 40, and elements 44A to 44D for at least a second size that is different from the first size.

The invention claimed is:

1. An installation (20) for producing thermoplastic containers (18) comprising:
   a container coating station (34) comprising an input wheel (38) and an output wheel (40), each of said wheels (38, 40) being equipped with gripping elements (39, 41) that are uniformly distributed on its periphery;
   an upstream transfer wheel (42A) that is equipped with gripping elements (44A) that are uniformly distributed on its periphery, the upstream transfer wheel (42A) being positioned to make possible the transfer of containers (18) by synchronized passage when a gripping element (44A) of the upstream transfer wheel carrying a container coincides with a gripping element (39) of the input wheel (38) in an input tangential zone (54A) between the two wheels (42A, 38);
   a downstream transfer wheel (42C) equipped with gripping elements (44C) uniformly distributed on its periphery, the downstream transfer wheel (42C) being positioned to make possible the transfer of containers (18) by synchronized passage when a gripping element (41) of the output wheel (40) carrying a container (18) coincides with a gripping element (44C) of the downstream transfer wheel (42C) in an output tangential zone (54B) between the two wheels (42C, 40);
   further comprising a bypass wheel (42B) equipped with elements (44B) for individual gripping of containers (18) that are uniformly distributed on its periphery, the bypass wheel (42B) being directly tangent with the upstream transfer wheel (42A) in an upstream tangential zone (49A) and the bypass wheel (42B) being directly tangent with the downstream transfer wheel (42C) in a downstream tangential zone (49B), the gripping element (44B) of the bypass wheel being structured for cooperating with the gripping element (44A) of the upstream transfer wheel for receiving the containers and for cooperating with the gripping elements (44C) of the downstream transfer wheel for releasing the containers.

2. The installation (20) according to claim 1, wherein the upstream tangential zone (49A) between the upstream transfer wheel (42A) and the bypass wheel (42B) is positioned downstream from the input tangential zone (54A) between the upstream transfer wheel (42A) and the input wheel (38).

3. The installation (20) according to claim 1, wherein the downstream tangential zone (49B) between the bypass wheel (42B) and the downstream transfer wheel (42C) is positioned upstream from the output tangential zone (54B) between the downstream transfer wheel (42C) and the output wheel (40).

4. The installation (20) according to claim 3, wherein two consecutive gripping elements (39, 41) of each of the input and output wheels (38, 40) are separated by a circumferential spacing (P1) that is two times greater than the circumferential spacing (P2) separating two consecutive gripping elements (44A, 44C) of each of the upstream and downstream transfer wheels (42A, 42C).

5. The installation (20) according to claim 1, wherein each upstream and downstream transfer wheel (42A, 42C) is equipped with first gripping elements (44A-i, 44C-i) that are suitable for the gripping of containers having a first size that are arranged alternating with the second gripping elements (44A-p, 44C-p) that are suitable for the gripping of containers (18) having a second size.

6. The installation (20) according to claim 5, wherein two consecutive gripping elements (44B) of the bypass wheel (42B) are separated by a circumferential spacing (P1) that is two times greater than the circumferential spacing (P2) separating two consecutive gripping elements (44A, 44C) of each of the upstream and downstream transfer wheels (42A, 42C).

7. The installation (20) according to claim 5, wherein two consecutive gripping elements (44B) of the bypass wheel (42B) are separated by a circumferential spacing (P2) that is identical to the circumferential spacing (P2) separating two consecutive gripping elements (44A, 44C) of each of the upstream and downstream transfer wheels (42A, 42C).

8. The installation (20) according to claim 7, wherein the bypass wheel (42B) is equipped with first gripping elements (44B) that are suitable for the gripping of containers (18) having the first size that are positioned alternately with the second gripping elements (44B) that are suitable for the gripping of containers (18) having the second size.

9. A method for using, in a mode for bypassing the coating station (34), the installation (20) made according to claim 1, wherein the upstream transfer wheel (42A) and the downstream transfer wheel (42C) have each an even number of gripping elements (44A, 44C) so as to comprise a series of even gripping elements alternating with a series of odd gripping elements, the method comprising:
   distributing containers on each even gripping element of the upstream transfer wheel (42A), the odd gripping element of the upstream transfer wheel (42A) being left empty, the bypass wheel (42B) rotating in a synchronized manner with the upstream and downstream transfer wheels (42A, 42C).

10. The method according to claim 9, wherein the method further comprises synchronizing the input and output wheels (38, 40) from the transfer wheels (42A, 42C), the gripping elements (39, 41) of said input and output wheels (38, 40) able to interfere with the passage of the containers (18) being removed.

11. The method according to claim 9, wherein the method comprises synchronizing in rotation the input wheel (38) and the output wheel (40) with the transfer wheels (42A, 42C) so that the gripping elements of the input and output wheels (38, 40) coincide with the empty gripping elements (44A, 44C) in the input and output tangential zones (49A, 49B).

12. The installation (20) according to claim 2, wherein the downstream tangential zone (49B) between the bypass wheel (42B) and the downstream transfer wheel (42C) is positioned upstream from the output tangential zone (54B) between the downstream transfer wheel (42C) and the output wheel (40).

13. The installation (20) according to claim 2, wherein each upstream and downstream transfer wheel (42A, 42C) is equipped with first gripping elements (44A-i, 44C-i) that are suitable for the gripping of containers having a first size that are arranged alternating with the second gripping elements (44A-p, 44C-p) that are suitable for the gripping of containers (18) having a second size.

14. The installation (20) according to claim 3, wherein each upstream and downstream transfer wheel (42A, 42C) is equipped with first gripping elements (44A-i, 44C-i) that are suitable for the gripping of containers having a first size that are arranged alternating with the second gripping elements (44A-p, 44C-p) that are suitable for the gripping of containers (18) having a second size.

15. The installation (20) according to claim 4, wherein each upstream and downstream transfer wheel (42A, 42C) is equipped with first gripping elements (44A-i, 44C-i) that are suitable for the gripping of containers having a first size that are arranged alternating with the second gripping elements (44A-p, 44C-p) that are suitable for the gripping of containers (18) having a second size.

16. The installation (20) according to claim 2, wherein two consecutive gripping elements (44B) of the bypass wheel (42B) are separated by a circumferential spacing (P2) that is identical to the circumferential spacing (P2) separating two consecutive gripping elements (44A, 44C) of each of the upstream and downstream transfer wheels (42A, 42C).

17. The installation (20) according to claim 3, wherein two consecutive gripping elements (44B) of the bypass wheel (42B) are separated by a circumferential spacing (P2) that is identical to the circumferential spacing (P2) separating two consecutive gripping elements (44A, 44C) of each of the upstream and downstream transfer wheels (42A, 42C).

18. The installation (20) according to claim 4, wherein two consecutive gripping elements (44B) of the bypass wheel (42B) are separated by a circumferential spacing (P2) that is identical to the circumferential spacing (P2) separating two consecutive gripping elements (44A, 44C) of each of the upstream and downstream transfer wheels (42A, 42C).

19. The installation (20) according to claim 1, wherein two consecutive gripping elements (44B) of the bypass wheel (42B) are separated by a circumferential spacing (P2) that is identical to the circumferential spacing (P2) separating two consecutive gripping elements (44A, 44C) of each of the upstream and downstream transfer wheels (42A, 42C).

20. A method for using, in a mode for bypassing the coating station (34), the installation (20) made according to claim 2, wherein the upstream transfer wheel (42A) and the downstream transfer wheel (42C) have each an even number of gripping elements (44A, 44C) so as to comprise a series of even gripping elements alternating with a series of odd gripping elements, the method comprising:

distributing containers on each even gripping element of the upstream transfer wheel (42A), the odd gripping element of the upstream transfer wheel (42A) being left empty, the bypass wheel (42B) rotating in a synchronized manner with the upstream and downstream transfer wheels (42A, 42C).

\* \* \* \* \*